United States Patent [19]

Fogg et al.

[11] 3,958,152
[45] May 18, 1976

[54] PROTECTION CIRCUITRY FOR CATHODE RAY TUBES

[75] Inventors: Orvel Douglas Fogg; Eugene Kenneth Severson, both of Colorado Springs, Colo.

[73] Assignee: Hewlett-Packard Company, Palo Alto, Calif.

[22] Filed: Aug. 23, 1973

[21] Appl. No.: 390,976

[52] U.S. Cl............................... 315/381; 315/386
[51] Int. Cl.² ........................................ H01J 29/52
[58] Field of Search ............ 315/20, 383, 384, 386, 315/381

[56] References Cited
UNITED STATES PATENTS

| | | | |
|---|---|---|---|
| 3,146,372 | 8/1964 | Fertig................................. | 315/381 |
| 3,399,324 | 8/1968 | Brown................................. | 315/20 |
| 3,510,722 | 5/1970 | Curtis................................. | 315/20 |
| 3,535,445 | 10/1970 | Griffery............................... | 315/20 |
| 3,588,608 | 6/1971 | Halinski et al....................... | 315/20 |
| 3,784,870 | 1/1974 | Dorsey................................ | 315/20 |

Primary Examiner—Maynard R. Wilbur
Assistant Examiner—T. M. Blum
Attorney, Agent, or Firm—William E. Hein

[57] ABSTRACT

Both velocity and x-y deflection magnitude of a cathode ray tube (CRT) electron beam are continuously sensed, and beam intensity is limited to prevent damage to the CRT during periods of insufficient beam deflection.

2 Claims, 1 Drawing Figure

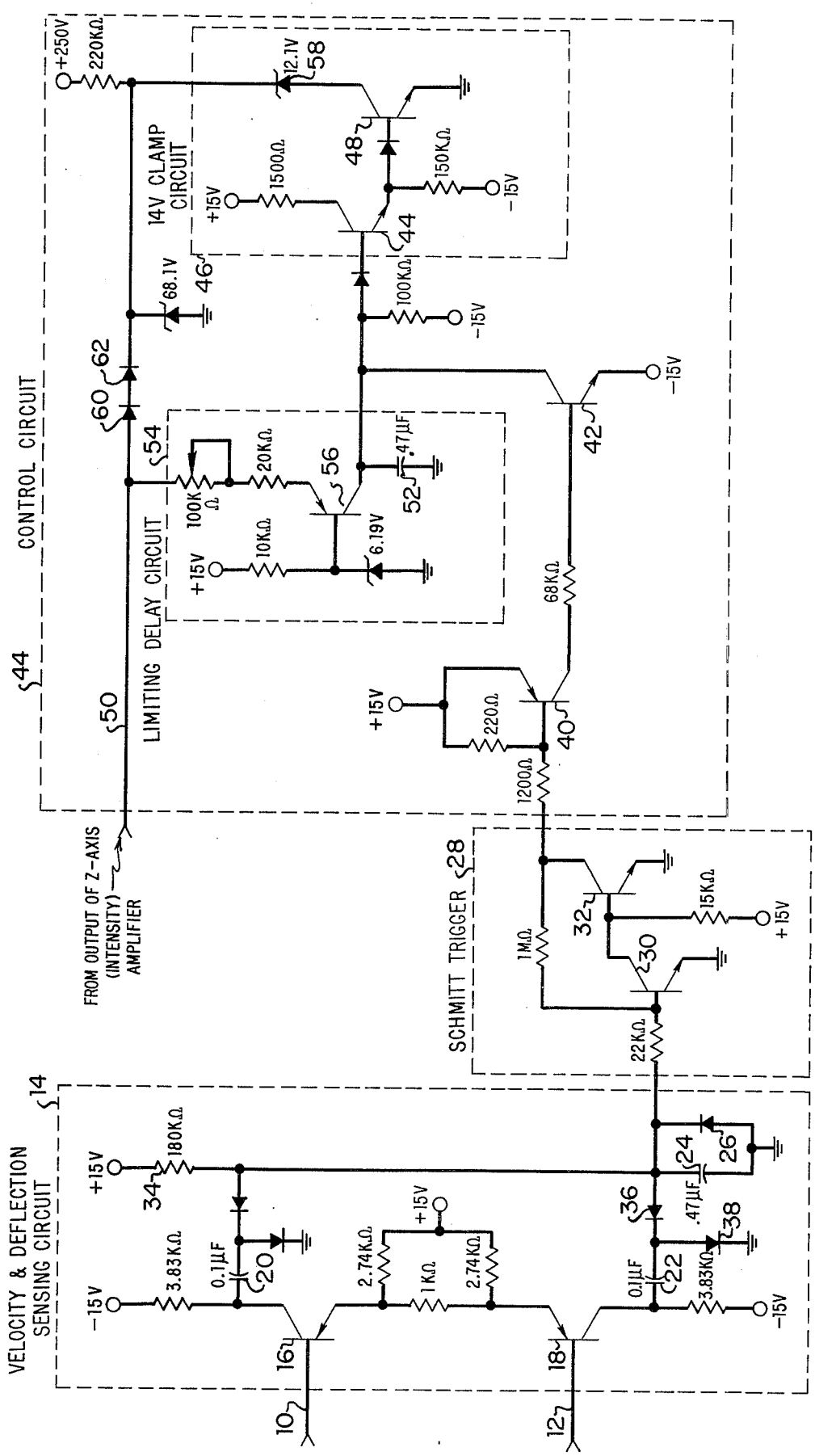

PROTECTION CIRCUITRY FOR CATHODE RAY TUBES

BACKGROUND AND SUMMARY OF THE INVENTION

Cathode ray tubes such as are employed, for example, in oscilloscopes, are easily damaged by excessive beam intensity during periods of time when the electron beam is moving slowly or not at all. If, for example, the operator has adjusted the beam intensity for viewing a relatively fast deflection signal and that signal is interrupted or removed, the resultant high intensity of the electron beam may burn the CRT phosphor and warp or melt the CRT expansion mesh.

One known CRT protection scheme switches a large series impedance into the cathode circuit to reduce beam intensity upon detection of a harmful condition. A disadvantage of this prior art method is that the reaction time of the sensing circuit is a direct function of the magnitude of the x-y deflection at the point of interruption. In the case of a large deflection signal the resulting large reaction time may allow damage to the CRT. Another problem associated with this protection method is the unreliability of high voltage switches which are required to switch the series impedance. Failure of such a switch may cause major damage to the CRT and associated circuitry.

Other prior art CRT protection circuits sense only the velocity of the electron beam. Since these circuits require a minimum beam velocity irrespective of deflection magnitude before protection begins, repetitive signals of low deflection magnitude would not trigger the protection circuit but may nevertheless damage the CRT. In addition, all of these prior art circuits render the intensity control totally inoperative during the limiting period.

Accordingly, it is an object of the present invention to provide a CRT protection circuit having a constant reaction time, as measured from the point at which the deflection signal is interrupted or removed until beam intensity limiting begins.

It is a further object of the present invention to provide a CRT protection circuit in which the operator has control of the beam intensity at all times, including that portion of time during which limiting occurs.

It is yet a further object of the present invention to provide a CRT protection circuit which allows the user to have full control of the beam intensity for a specified period of time after the beam begins moving subsequent to being in a fixed position at minimum intensity.

These objects are accomplished in accordance with the preferred embodiment of this invention by employing a velocity and x-y deflection magnitude sensing circuit having a constant reaction time and a control circuit for clamping the output of the Z-axis (beam intensity) amplifier. The control circuit includes a limiting delay circuit which enables the operator to have full control over beam intensity for a finite time after the beam begins moving subsequent to being stationary with minimum beam intensity.

DESCRIPTION OF THE DRAWING

The drawing shows a detailed schematic diagram of a CRT protection circuit according to the preferred embodiment of the invention.

DESCRIPTION OF THE PREFERRED EMBODIMENT

Referring to the drawing, there is shown a velocity and deflection sensing circuit 14 which receives at inputs 10 and 12 a signal proportional to the electron beam position on a CRT. This signal may comprise, for example, the output of the x-y amplifiers of an oscilloscope. Magnitude and velocity of deflection are sensed at the collectors of a pair of transistors 16 and 18, and this information is then AC coupled through a pair of capacitors 20 and 22. The resulting signal attempts to drive a capacitor 24 negative, but the maximum negative excursion is limited by a diode 26 to −0.6 volts. At this point the signal is applied to a Schmitt trigger 28 including a pair of transistors 30 and 32. When the voltage at capacitor 24 is less than +0.6 volts, transistor 30 is cut off and transistor 32 is conducting. In the event the signal at inputs 10 and 12 is removed, capacitor 24 charges toward the +15-volt supply through a resistor 34. However, a pair of diodes 36 and 38 limits the charge level to +1.2 volts. When capacitor 24 reaches a charge level of +0.6 volts Schmitt trigger 28 changes state so that transistor 32 is cut off.

Capacitor 24 and resistor 34 determine the reaction time of the protection circuit, as measured from the point at which interruption or removal of the deflection signal occurs to the point at which beam intensity limiting occurs. In accordance with the preferred embodiment this reaction time is arranged to be approximately 6 milliseconds, which is a safe period of maximum intensity of a stationary beam. Diode 26 is employed to limit the negative voltage swing of capacitor 24 to −0.6 volts, thus providing a reaction time which is constant rather than a function of deflection signal magnitude. In the absence of diode 26, capacitor 24 would be allowed to charge as far negative as −15 volts. The resultant reaction time would be lengthened considerably and the possibility of CRT damage greatly increased.

As discussed above, unless the beam deflection signal is interrupted or removed so that intensity limiting is required, transistor 32 is conducting. In this situation a pair of transistors 40 and 42 within a control circuit 44 are saturated. Since transistor 42 is saturated, the base of a transistor 44 within a clamp circuit 46 is pulled negative. As a result, both transistor 44 and another transistor 48 within clamp circuit 46 are cut off. Under this condition, a line 50, which represents the output of a Z-axis (beam intensity) amplifier, is not clamped, and therefore full intensity control is allowed the operator.

In the event the electron beam is substantially slowed or stops moving entirely, damage to the CRT will result unless the beam intensity is immediately limited to a safe level. In this situation, Schmitt trigger 28 changes state so that transistor 32 turns off. As a result, both transistors 40 and 42 are cut off. This allows a capacitor 52 within a limiting delay circuit 54 to begin charging through the collector of a transistor 56. Transistor 56 is biased to conduct when the Z-axis output 50 is greater than a level at which the electron beam just becomes visible. According to the present embodiment this level is 7 volts. As capacitor 52 charges, transistors 42 and 44 turn on, thus clamping the Z-axis output 50 to 14 volts through a zener diode 58 and two diodes 60 and 62. By clamping the Z-axis output, beam intensity is limited to a level which will not cause damage to the CRT.

The rate at which capacitor 52 charges, and hence the delay associated with turn-on of transistors 44 and 48, is determined by the current flow through transistor 56. This delay is advantageous in that it allows full intensity control immediately after the electron beam begins moving subsequent to being stationary. For example, if the beam has been stationary with the intensity turned off and suddenly begins moving with the application of a gate signal, the first portion of the trace would be dim or invisible if no delay is provided in the protection circuit. Since velocity and deflection sensing circuit 14 requires a finite time to sense that beam movement is sufficient to prevent CRT damage, this delay insures that beam intensity will not be limited during that time. The delay period is limited to a few milliseconds to eliminate the possibility of damage to the CRT. Subsequent to the delay period, of course, the protection circuit will operate as discussed above to either limit the beam intensity or allow the operator full intensity control, depending on velocity and deflection magnitude of the electron beam.

What is claimed is:

1. Circuitry for protecting a cathode ray tube against excessive beam intensity, the circuit comprising:

sensing means for detecting movement of a cathode ray tube electron beam and for issuing a signal that is indicative of beam movement insufficent to allow continuous full beam intensity; and control means coupled to the sensing means and to an intensity line, the control means being responsive to the signal issued by the sensing means for clamping the intensity line to a predetermined maximum voltage limiting beam intensity to a level such that a visible indication of the electron beam is provided but such that damage to the cathode ray tube is prevented, the control means being further responsive to initiation of movement of the electron beam subsequent to a period of time during which the electron beam has been stationary at minimum intensity for providing increased beam intensity including full beam intensity, as selected by the user, for a predetermined period of time immediately following such initiation of movement of the electron beam, said predetermined period of time having a limited duration permitting the user to view movement of the electron beam while preventing damage to the cathode ray tube, and wherein the control means includes a limiting delay circuit for inhibiting limiting of the intensity of electron beam during said predetermined period of time.

2. Circuitry for protecting a cathode ray tube against excessive beam intensity as in claim 1 wherein the intensity line comprises an output line of a Z-axis amplifier of an oscilloscope, thereby permitting the voltage of the intensity line to be adjusted by the user up to the predetermined maximum voltage to which the intensity line is clamped.

* * * * *